United States Patent [19]
Kinker et al.

[11] Patent Number: 6,140,431
[45] Date of Patent: Oct. 31, 2000

[54] PROCESS FOR PREPARING CONTINUOUSLY VARIABLE-COMPOSITION COPOLYMERS

[75] Inventors: Bernard George Kinker, Kintnersville; Joseph Martin Bollinger, North Wales; Robert Howard Gore, Southampton; David Arthur Pierce, Warrington, all of Pa.

[73] Assignee: Rohm and Haas Company, Philadelphia, Pa.

[21] Appl. No.: 09/023,149

[22] Filed: Feb. 12, 1998

Related U.S. Application Data

[60] Provisional application No. 60/039,186, Feb. 27, 1997.

[51] Int. Cl.$^7$ ........................................ C08F 2/00
[52] U.S. Cl. ...................... 526/79; 526/328.5; 526/329.3
[58] Field of Search ................... 526/79, 328.5, 526/329.3

[56] References Cited

U.S. PATENT DOCUMENTS

| | | |
|---|---|---|
| 4,048,413 | 9/1977 | Wilkens . |
| 5,281,329 | 1/1994 | Mueller et al. . |
| 5,468,817 | 11/1995 | Da Lio et al. ........................ 526/328.5 |

FOREIGN PATENT DOCUMENTS

| | | |
|---|---|---|
| 0 140 274 | 5/1985 | European Pat. Off. . |
| 0 561 078 | 9/1993 | European Pat. Off. . |
| 2 228 790 | 12/1974 | France . |
| WO 92/01004 | 1/1992 | WIPO . |

OTHER PUBLICATIONS

B. Zhao, J. Shenyang Inst. Chem. Tech., vol. 8, No. 3, pp. 1–5, "Depression Effect of Mixed Pour Point Depressants for Crude Oil", 1994, (translated from the original text of pp. 228–230).

R.J. Kopko, et al., Society of Automotive Engineers, Fuels and Lubricants Meeting, pp. 1–11, "Effect of VI Improver on the In–Service Viscosity of Hydraulic Fluids", Jun. 3–5, 1975.

*Primary Examiner*—Bernard Lipman
*Attorney, Agent, or Firm*—Oblon, Spivak, McClelland, Maier & Neustadt, P.C.

[57] ABSTRACT

A process for the preparation of continuously variable-composition copolymers by effecting gradual changes in monomer composition during the polymerization is disclosed. Poly(meth)acrylate copolymers made by the process of the present invention have improved lubricating oil additive properties, for example, as pour point depressants, when compared to related polymer additives made by conventional means.

16 Claims, No Drawings

PROCESS FOR PREPARING CONTINUOUSLY VARIABLE-COMPOSITION COPOLYMERS

This application claims benefit of provisional application 60/039,186, filed Feb. 27, 1997.

BACKGROUND OF THE INVENTION

This invention relates to the preparation of continuously variable-composition copolymers by effecting gradual changes in monomer composition during the polymerization process. An example of application of this process is the preparation of poly(meth)acrylate copolymers that have improved lubricating oil additive properties, for example, as pour point depressants or viscosity index improvers, when compared to related polymer additives made by conventional means.

The behavior of petroleum oil formulations under cold flow conditions is greatly influenced by the presence of paraffins (waxy materials) that crystallize out of the oil upon cooling; these paraffins significantly reduce the fluidity of the oils at low temperature conditions. Polymeric flow improvers, known as pour point depressants, have been developed to effectively reduce the "pour point" or solidifying point of oils under specified conditions (that is, the lowest temperature at which the formulated oil remains fluid). Pour point depressants are effective at very low concentrations, for example, between 0.05 and 1 percent by weight in the oil. It is believed that the pour point depressant material incorporates itself into the growing paraffin crystal structure, effectively hindering further growth of the crystals and the formation of extended crystal agglomerates, thus allowing the oil to remain fluid at lower temperatures than otherwise would be possible.

One limitation of the use of pour point depressant polymers is that petroleum base oils from different sources contain varying types of waxy or paraffin materials and not all polymeric pour point depressants are equally effective in reducing the pour point of different petroleum oils, that is, a polymeric pour point depressant may be effective for one type of oil and ineffective for another. It would be desirable for a single pour point depressant polymer to be useful in a wide variety of petroleum oils.

One approach to solving this problem is disclosed in "Depression Effect of Mixed Pour Point Depressants for Crude Oil" by B. Zhao, *J. Shenyang, Inst. Chem. Tech.*, 8(3), 228–230 (1994), where improved pour point performance on two different crude oil samples was obtained by using a physical mixture of two different conventional pour point depressants when compared to using the pour point depressants individually in the oils. Similarly, U.S. Pat. No. 5,281,329 and European Patent Application EP 140,274 disclose the use of physical mixtures of different polymeric additives to achieve improved pour point properties when compared to using each polymer additive alone in lubricating oils.

U.S. Pat. No. 4,048,413 discloses a process for the preparation of uniform-composition copolymers by controlling the ratio and rate of addition of the monomers added to a polymerizing mixture of the monomers to offset the natural differences in reactivities of the individual monomers that would normally lead to compositional "drift" during conventional polymerizations. There is no disclosure in U.S. Pat. No. 4,048,413 of controlling the ratio and rate of addition of monomers to a polymerization mixture to provide a continuously changing- or continuously variable-composition copolymer.

None of these previous approaches provides good low temperature fluidity when a single polymer additive is used in a wide range of lubricating oil formulations. It is an object of the present invention to provide a process for preparing copolymers having a continuously variable-composition and, in doing so, to also provide polymers having the aforementioned desired combination of lubricating oil properties in a single polymer additive.

SUMMARY OF THE INVENTION

The present invention provides a process for preparing continuously variable-composition copolymers comprising (a) forming a first reaction mixture comprising a monomer-containing phase in which two or more copolymerizable monomers are present in a weight percent ratio from $X_1/Y_1$ to $Y_1/X_1$, (b) forming one or more additional reaction mixtures comprising a monomer-containing phase in which two or more copolymerizable monomers are present in a weight percent ratio from $X_n/Y_n$ to $Y_n/X_n$, (c) initiating a free-radical addition polymerization by gradual addition of the first reaction mixture or a mixture of the first reaction mixture with the one or more additional reaction mixtures to a reactor under polymerization conditions, (d) continuing the polymerization by gradual addition of the one or more additional reaction mixtures (i) to the reactor or (ii) to the first reaction mixture being added to the reactor at a point prior to where the first reaction mixture is added to the reactor, and (e) maintaining polymerization conditions until at least 90% of the two or more copolymerizable monomers has been converted to copolymer; wherein $X_1$ and $Y_1$ represent weight percents of any two X and Y monomers of the two or more copolymerizable monomers in the first reaction mixture; $X_n$ and $Y_n$ represent weight percents of any two X and Y monomers of the two or more copolymerizable monomers in the one or more additional reaction mixtures; $X_1$, $X_n$, $Y_1$ and $Y_n$ have values from zero to 100 percent; n represents successive integers from 2 to 10 corresponding to each of the one or more additional reaction mixtures containing the analogous $X_n$ and $Y_n$ weight percents; the maximum value of n represents the total number of reaction mixtures used in the process; wherein the gradual addition of the one or more additional reaction mixtures in step (d) is conducted such that at least one of $[X_i-X_T]$ or $[Y_i-Y_T]$ absolute values in the reactor is at least 5 percent and $X_i$, $X_T$, $Y_i$ and $Y_T$ represent instantaneous weight percents of any two X and Y monomers added to the reactor initially ($X_i$ and $Y_i$) and at some time later in the polymerization ($X_T$ and $Y_T$).

The present invention also provides variable-composition copolymers prepared by the aforementioned process wherein the copolymerizable monomers are selected from one or more of vinylaromatic monomers, nitrogen-containing ring compound monomers, α-olefins, vinyl alcohol esters, vinyl halides, vinyl nitrites, (meth)acrylic acid derivatives, maleic acid derivatives and fumaric acid derivatives.

The present invention further provides a method for maintaining low temperature fluidity of lubricating oil compositions comprising adding from 0.05 to 3 percent by weight of the variable-composition copolymer prepared according to the aforementioned process to a lubricating oil.

In another embodiment, the present invention provides a continuously variable-composition copolymer comprising at least four different single-composition copolymers wherein no single-composition copolymer represents more than 50 weight percent of the variable-composition copolymer and the single-composition copolymers have monomeric units selected from two or more of methyl methacrylate, butyl methacrylate, isodecyl methacrylate, lauryl-myristyl methacrylate, dodecyl-pentadecyl methacrylate, cetyl-eicosyl methacrylate and cetyl-stearyl methacrylate.

DETAILED DESCRIPTION OF THE INVENTION

As used herein, the term "alkyl (meth)acrylate" refers to either the corresponding acrylate or methacrylate ester; similarly, the term "(meth)acrylic" refers to either the corresponding acrylic or methacrylic acid and derivatives. As used herein, all percentages referred to will be expressed in weight percent (%), based on total weight of polymer or composition involved, unless specified otherwise. As used herein, the term "copolymer" or "copolymer material" refers to polymer compositions containing units of two or more monomers or monomer types.

As used herein, the term "gradual addition" refers to continuous or intermittent addition of monomer, monomer mixture or monomers over a period of time, dropwise or in a stream, including, for example: separate feeds of different monomers or mixtures of monomers to a polymerization reactor (reaction vessel); or separately metered feeds of different monomers or mixtures of monomers where the separate monomer mixtures may be combined at a point prior to where one monomer mixture is added to the reactor, such as may be achieved by using an in-line mixing device or by feeding one monomer mixture directly into the holding vessel of another monomer mix that is being fed to the polymerization reactor, whereby the relative ratios of the monomers may be varied to accommodate a desired effect. As used herein, "intermittent" addition includes the brief interruption of the addition of monomer feed to the reactor or in-line mixing device so long as the interruption corresponds to a theoretical formation of no more than about 50% of a single-composition copolymer (based on monomer ratio in the reactor) within the range of copolymer compositions formed during the polymerization. Intermittent addition may also include multiple discrete additions of monomers or monomer mixtures, where the compositions of the monomer mixture at each discrete addition differs from at least one of the compositions of the other discrete additions by at least 5% in one or more components of the monomer mixture and the maximum contribution of any discrete monomer addition corresponds to less than 50% of a single-composition copolymer (based on monomer ratio in the reactor) within the range of copolymer compositions formed during the polymerization.

As used herein, "theoretical formation" corresponds to the amount (weight %) of a specific single-composition copolymer formed as a fraction of the entire range of copolymer compositions available, based on the assumption that all monomers added to the polymerization medium are substantially instantly converted to copolymer (in the ratio represented by the immediate compositional environment). For example, if 10% of the total monomer feed during a polymerization corresponds to a single X/Y copolymer composition, then the final copolymer material will theoretically contain 10% of that single composition. If monomers are fed to the polymerization medium under conditions not corresponding to polymerization conditions, such as cooling the reaction mixture to a temperature where little or no polymerization may occur, then the specific copolymer composition formed during this period of time will be based on the theoretical formation of a copolymer composition corresponding to the average composition delivered to the reactor prior to the establishment or re-establishment of polymerization conditions.

As used herein, "under polymerization conditions" refers to conditions within the polymerization reactor sufficient to produce substantial incorporation of any monomers present into copolymer; that is, for example, the combination of temperature, type of free-radical initiator, and any optional promoter, provides an environment where the half-life of the initiator system is less than about 2 hours, preferably less than 1 hour, more preferably less than 10 minutes and most preferably less than about 5 minutes.

As used herein, the term "continuously variable-composition" refers to a copolymer composition where there is a distribution of single-composition copolymers within a copolymer material, that is, a copolymer material derived from a single polymerization process. The distribution of single-composition copolymers must be such that no more than 50%, preferably no more than 20%, more preferably no more than about 10% and most preferably less than 5%, of any single-composition copolymer is represented within the distribution range of single-composition copolymers in the copolymer material and at least four, preferably at least 10 and more preferably at least 20, different single-composition copolymers comprise the continuously-variable composition copolymer.

For the purposes of the present invention, a copolymer having a continuously-variable composition is defined as having a difference of at least 5%, preferably at least 10%, more preferably at least 20% and most preferably at least 30% in at least one of the monomer or monomer type components of the single-composition copolymers of the copolymer composition range while satisfying the aforementioned requirement that no more than 50% of any single-composition copolymer is present in the copolymer material. A single-composition copolymer is defined as a copolymer differing from its nearest most similar copolymer by at least 1% in at least one monomeric component.

For example, in a copolymer material containing single-composition copolymers ranging from 70 Monomer X/30 Monomer Y to 30 Monomer X/70 Monomer Y (prepared by a polymerization using an initial 70 X/30 Y monomer mix and continuously adjusting the monomer mix composition until it is 30 X/70 Y at the end of the monomer feed), the 61 X/39 Y component is considered a single-composition copolymer and the 62 X/38 Y component is considered a different single-composition copolymer. Using this example to further illustrate the concept of continuously variable-composition copolymers, the aforementioned copolymer composition would theoretically contain at least 40 different single-composition copolymers, each differing by 1% between 70 X/30 Y and 30 X/70 Y based on the theoretical formation of each single-composition copolymer during the polymerization, assuming the composition of the monomer feed being polymerized had been continuously adjusted throughout the polymerization process from one extreme of X/Y composition to the other extreme of X/Y composition. In this case, the copolymer material can be described as theoretically having about 2.5% each of 40 different single-composition copolymers, each differing by successive increments of 1% X and 1% Y. If, however, the polymerization is conducted such that the first 20% of the monomer fed has a constant composition of 70 X/30 Y, the next 20% at 60 X/40 Y, the next 20% at 50 X/50 Y, the next 20% at 40 X/60 Y and the final 20% at 30 X/70 Y, then the copolymer material would, in this case, be described as theoretically having about 20% each of 5 different single-composition copolymers, each differing by increments of about 10% X and 10% Y.

An advantage of the process of the present invention is the ability to vary the number of different single-composition copolymers formed within a single polymerization process. The polymerization process may be multistaged and involve either single or multiple reactors; however, the process is directed towards producing a single continuously variable-composition copolymer in contrast to the preparation (in separate polymerizations) of different copolymers that are then combined to produce a physical mixture of single-composition copolymers (see U.S. Pat. No. 5,281,329 and European Patent Application EP 140,274). In this way, copolymers may be conveniently tailored to the specific end-use applications required of them without the need for multiple polymerization reactions and the isolation and storage of different copolymers to provide combination additive compositions.

There is no limitation on the extremes of the range of individual compositions within a given copolymer material prepared by the process of the present invention. For example, a copolymer material having an overall average composition of 50 X/50 Y may be composed of individual single-composition copolymers ranging from 100 X/0 Y to 0 X/100 Y or only from 55 X/45 Y to 45 X/55 Y. In a similar fashion, a copolymer material having an overall average composition of 80 X/10 Y/10 Z (where Z represents a third monomer) may be composed of individual single-composition copolymers ranging from, for example, 100 X/0 Y/0 Z to 40 X/10 Y/50 Z or only from 75 X/20 Y/5 Z to 85 X/0 Y/15 Z.

There is no limitation on the number of monomers or monomer types used to prepare continuously variable-composition copolymers of the present invention. The different monomers may be combined into one or more reaction mixtures to be added to the reactor or the different monomers may each represent a separate reaction mixture. Typically, the number (n) of reaction mixtures used is two (2), although as many as ten different reaction mixtures may be used. The monomer-containing phases of the reaction mixtures may each comprise a different monomer or monomer type or a combination of different monomers or monomer types, depending on the end result desired. For example, when four different monomers are used, for example methyl methacrylate, lauryl-myryistyl methacrylate, cetyl-stearyl methacrylate and hydroxypropyl methacrylate, each monomer may comprise a separate reaction mixture (n=4) to be added to the reactor or only two reaction mixtures may be used (i) each containing different ratios of at least two monomers, for example methyl methacrylate/cetyl-stearyl methacrylate or methyl methacrylate/hydroxypropyl methacrylate, with the remaining monomer concentrations remaining unchanged or (ii) each containing different ratios of any three monomers with the fourth monomer concentration remaining constant or (iii) each containing different concentrations of all four monomers.

The multiple monomer feeds can have different feed rates in order to control the incorporation of monomers of significantly different reactivities, such as (meth)acrylic esters and styrene derivatives. If desired, control of copolymer composition can be derived from application of the well-known copolymer equation based on the use of monomer reactivity ratios (*Textbook of Polymer Science* by F. W. Billmeyer, Jr., pp 310–325 (1966)). U.S. Pat. No. 4,048,413 discloses the use of monomer reactivity ratios and addition of increasing amounts of the more reactive monomer component of the desired copolymer during the polymerization to achieve a constant-composition copolymer. In contrast to the teachings and object of U.S. Pat. No. 4,048,413, the process of the present invention is directed to providing continuously-changing composition or continuously-variable composition copolymers during a single polymerization process.

Preferably, the process of the present invention is practiced to prepare copolymer materials having a large number of individual single-composition copolymers, the range being represented by extremes in copolymer composition established by the monomer feed conditions and monomer ratios. Variations in the composition of the monomer feeds during the polymerization are not limited to being uniformly increased or decreased from an initial composition proceeding towards a specified final composition. For example, in progressing from an initial 70 X/30 Y composition to a final 30 X/70 Y composition it is not necessary to progress smoothly from initial to final conditions; the X/Y ratio of the monomer feed may increase (for example up to 80 X/20 Y), remain constant or decrease (for example down to 20 X/80 Y) at any point during the feed; all that is necessary is that the overall requirements defining the preparation of a continuously variable-composition copolymer be satisfied:

(1) no single-composition copolymer composition may represent more than 50% of the copolymer material within the range of single-composition copolymers defining the copolymer material, (2) the copolymer material must contain individual single-composition copolymers having a difference of at least 5% between at least one of the monomer or monomer type components of the single-composition copolymers, (3) the copolymer material must contain at least four different single-composition copolymers, and (4) a single-composition copolymer is defined as having a composition differing from its nearest most similar composition by at least 1% in at least one monomeric component of the composition.

Monomers used in practicing the process of the present invention may be any monomers capable of polymerizing with comonomers and which are relatively soluble in the copolymer formed. Preferably the monomers are monoethylenically unsaturated monomers. Polyethylenically unsaturated monomers which lead to crosslinking during the polymerization are generally undesirable. Polyethylenically unsaturated monomers which do not lead to crosslinking or only crosslink to a small degree, for example, butadiene, are also satisfactory comonomers.

One class of suitable monoethylenically unsaturated monomers is vinylaromatic monomers that includes, for example, styrene, α-methylstyrene, vinyltoluene, ortho-, meta- and para-methylstyrene, ethylvinylbenzene, vinylnaphthalene and vinylxylenes. The vinylaromatic monomers can also include their corresponding substituted counterparts, for example, halogenated derivatives, that is, containing one or more halogen groups, such as fluorine, chlorine or bromine; and nitro, cyano, alkoxy, haloalkyl, carbalkoxy, carboxy, amino and alkylamino derivatives.

Another class of suitable monoethylenically unsaturated monomers is nitrogen-containing ring compounds, for example, vinylpyridine, 2-methyl-5-vinylpyridine, 2-ethyl-5-vinylpyridine, 3-methyl-5-vinylpyridine, 2,3-dimethyl-5-vinylpyridine, 2-methyl-3-ethyl-5-vinylpyridine, methyl-substituted quinolines and isoquinolines, 1-vinylimidazole, 2-methyl-1-vinylimidazole, N-vinylcapro-lactam, N-vinylbutyrolactam and N-vinylpyrrolidone.

Another class of suitable monoethylenically unsaturated monomers is ethylene and substituted ethylene monomers, for example: α-olefins such as propylene, isobutylene and long chain alkyl α-olefins (such as $(C_{10}-C_{20})$alkyl α-olefins); vinyl alcohol esters such as vinyl acetate and vinyl stearate; vinyl halides such as vinyl chloride, vinyl fluoride, vinyl bromide, vinylidene chloride, vinylidene fluoride and vinylidene bromide; vinyl nitriles such as acrylonitrile and methacrylonitrile; (meth)acrylic acid and derivatives such as corresponding amides and esters; maleic acid and derivatives such as corresponding anhydride, amides and esters; fumaric acid and derivatives such as corresponding amides and esters; itaconic and citraconic acids and derivatives such as corresponding anhydrides, amides and esters.

A preferred class of (meth)acrylic acid derivatives is represented by alkyl (meth)acrylate, substituted (meth) acrylate and substituted (meth)acrylamide monomers. Each of the monomers can be a single monomer or a mixture having different numbers of carbon atoms in the alkyl portion. Preferably, the monomers are selected from the group consisting of $(C_1-C_{24})$alkyl (meth)acrylates, hydroxy $(C_2-C_6)$alkyl (meth)acrylates, dialkylamino$(C_2-C_6)$alkyl (meth)acrylates and dialkylamino$(C_2-C_6)$alkyl (meth) acrylamides. The alkyl portion of each monomer can be linear or branched.

Particularly preferred polymers useful in the process of the present invention are the poly(meth)acrylates derived from the polymerization of alkyl (meth)acrylate monomers. Examples of the alkyl (meth)acrylate monomer where the alkyl group contains from 1 to 6 carbon atoms (also called the "low-cut" alkyl (meth)acrylates), are methyl methacrylate (MMA), methyl and ethyl acrylate, propyl methacrylate, butyl methacrylate (BMA) and acrylate (BA), isobutyl methacrylate (IBMA), hexyl and cyclohexyl methacrylate, cyclohexyl acrylate and combinations thereof Preferred low-cut alkyl methacrylates are methyl methacrylate and butyl methacrylate.

Examples of the alkyl (meth)acrylate monomer where the alkyl group contains from 7 to 15 carbon atoms (also called the "mid-cut" alkyl (meth)acrylates), are 2-ethylhexyl acrylate (EHA), 2-ethylhexyl methacrylate, octyl methacrylate, decyl methacrylate, isodecyl methacrylate (IDMA, based on branched $(C_{10})$alkyl isomer mixture), undecyl methacrylate, dodecyl methacrylate (also known as lauryl methacrylate), tridecyl methacrylate, tetradecyl methacrylate (also known as myristyl methacrylate), pentadecyl methacrylate and combinations thereof. Also useful are: dodecyl-pentadecyl methacrylate (DPMA), a mixture of linear and branched isomers of dodecyl, tridecyl, tetradecyl and pentadecyl methacrylates; and lauryl-myristyl methacrylate (LMA), a mixture of dodecyl and tetradecyl methacrylates. The preferred mid-cut alkyl methacrylates are lauryl-myristyl methacrylate, dodecyl-pentadecyl methacrylate and isodecyl methacrylate.

Examples of the alkyl (meth)acrylate monomer where the alkyl group contains from 16 to 24 carbon atoms (also called the "high-cut" alkyl (meth)acrylates), are hexadecyl methacrylate (also known as cetyl methacrylate), heptadecyl methacrylate, octadecyl methacrylate (also known as stearyl methacrylate), nonadecyl methacrylate, eicosyl methacrylate, behenyl methacrylate and combinations thereof. Also useful are: cetyl-eicosyl methacrylate (CEMA), a mixture of hexadecyl, octadecyl, and eicosyl methacrylate; and cetyl-stearyl methacrylate (SMA), a mixture of hexadecyl and octadecyl methacrylate. The preferred high-cut alkyl methacrylates are cetyl-eicosyl methacrylate and cetyl-stearyl methacrylate.

The mid-cut and high-cut alkyl (meth)acrylate monomers described above are generally prepared by standard esterification procedures using technical grades of long chain aliphatic alcohols, and these commercially available alcohols are mixtures of alcohols of varying chain lengths containing between 10 and 15 or 16 and 20 carbon atoms in the alkyl group. Consequently, for the purposes of this invention, alkyl (meth)acrylate is intended to include not only the individual alkyl (meth)acrylate product named, but also to include mixtures of the alkyl (meth)acrylates with a predominant amount of the particular alkyl (meth)acrylate named. The use of these commercially available alcohol mixtures to prepare (meth)acrylate esters results in the LMA, DPMA, SMA and CEMA monomer types described above. Preferred (meth)acrylic acid derivatives useful in the process of the present invention are methyl methacrylate, butyl methacrylate, isodecyl methacrylate, lauryl-myristyl methacrylate, dodecyl-pentadecyl methacrylate, cetyl-eicosyl methacrylate and cetyl-stearyl methacrylate.

For the purposes of the present invention, it is understood that copolymer compositions representing combinations of the monomers from aforementioned classes of monomers may be prepared using the process of the present invention. For example, copolymers of alkyl (meth)acrylate monomers and vinylaromatic monomers, such as styrene; copolymers of alkyl (meth)acrylate monomers and substituted (meth) acrylamide monomers, such as N,N-dimethylaminopropyl methacrylamide; copolymers of alkyl (meth)acrylate monomers and monomers based on nitrogen-containing ring compounds, such as N-vinylpyrrolidone; copolymers of vinyl acetate with fumaric acid and its derivatives; and copolymers of (meth)acrylic acid and its derivatives with maleic acid and its derivatives.

The process of the present invention provides a means of preparing a mixture of a large number of copolymer compositions in a single operation by controlling the introduction of individual monomers or monomer types into the polymerizing medium during polymerization. As used herein, "monomer type" refers to those monomers that represent mixtures of individual closely related monomers, for example, LMA (mixture of lauryl and myristyl methacrylates), DPMA (a mixture of dodecyl, tridecyl, tetradecyl and pentadecyl methacrylates), SMA (mixture of hexadecyl and octadecyl methacrylates), CEMA (mixture of hexadecyl, octadecyl and eicosyl methacrylates). For the purposes of the present invention, each of these mixtures represents a single monomer or "monomer type" when describing monomer ratios and copolymer compositions. For example, a copolymer described as having a 70/30 LMA/CEMA composition is considered to contain 70% of a first monomer or monomer type (LMA) and 30% of a second monomer or monomer type (CEMA), although it is understood that the copolymer contains at least 5 different individual monomers (lauryl, myristyl, hexadecyl, octadecyl and eicosyl methacrylates).

Lubricating oil additives, for example pour point depressants, thickeners, viscosity index (VI) improvers and dispersants, may be prepared using the process of the present invention. In these cases, continuously variable-composition copolymers comprising single-composition copolymers having monomeric units selected from two or more of methyl methacrylate, butyl methacrylate, isodecyl methacrylate, lauryl-myristyl methacrylate, dodecyl-pentadecyl methacrylate, cetyl-eicosyl methacrylate and cetyl-stearyl methacrylate are preferred. Preferably the continuously variable-composition copolymers used as lubricating oil additives have an overall average composition of 40–90% X and 10–60% Y and preferably 50–70% X and 30–50% Y, where X represents monomeric units selected from one or more of isodecyl methacrylate (IDMA), lauryl-myristyl methacrylate (LMA) and dodecyl-pentadecyl methacrylate (DPMA) and Y represents monomeric units selected from one or more of cetyl-eicosyl methacrylate (CEMA) and cetyl-stearyl methacrylate (SMA). Preferably the monomeric unit composition range of single-composition copolymers in continuously variable-composition copolymers used as lubricating oil additives is 5 to 100%, preferably from 10 to 80%, more preferably from 20 to 50% and most preferably from 30 to 40% for at least one of the monomeric unit components, X or Y; for example, using the same definitions for X and Y monomeric units as above, the continuously-variable-composition copolymers may contain 10 LMA/90 SMA copolymer up to 90 LMA/10 SMA copolymer (range of 80%) or 25 LMA/75 SMA copolymer up to 75 LMA/25 SMA copolymer (range of 50%) or 30 LMA/70 SMA copolymer up to 70 LMA/30 SMA copolymer (range of 40%), with each continuously-variable composition having an overall average composition of 50 LMA/50 SMA. The monomeric unit composition range need not be symmetrical around the overall average composition of the continuously-variable composition copolymer.

A preferred application of this technique is the preparation of VI improver additives that provide improved VI and low temperature performance by allowing greater amounts of low-solubility monomers, such as methyl methacrylate, to be used in the polymer additive. Another preferred application of this technique is the preparation of polymeric pour point depressant additives that provide improved low temperature fluidity when used in a variety of petroleum base oils. In general, low temperature is meant to refer to temperatures below about −20° C. (corresponds to −4° F.); fluidity at temperatures below about −25° C. (corresponds to −13° F.) is of particular interest in the use of pour point depressant additives.

When the process of the present invention is used to prepare lubricating oil additives, typical maximum $[X_i-X_T]$ or $[Y_i-Y_T]$ absolute values used during the polymerization are from 5 to 100%, preferably from 10 to 80% and more preferably from 20 to 50%. For example, pour point depressant additives based on variable-composition copolymers prepared where the $[X_i-X_T]$ or $[Y_i-Y_T]$ values are from 30 to 40% are preferred for use in a wide range of base oils.

Copolymers prepared by the process of the present invention offer wider applicability in treatment of base oils from different sources when compared to single-composition polymer additives or combinations of separately prepared single-composition polymer additives. In some cases the continuously-variable composition copolymers of the present invention equal or exceed the low temperature performance of comparable single-composition polymer additives or mixtures thereof; in all cases the continuously-variable composition copolymers offer the advantage of broader applicability to different base oils without requiring the separate preparation and then combination of different single-composition polymers to achieve satisfactory performance in a variety of base oils.

The process of this invention is used to produce continuously-variable composition copolymers by semi-batch or semi-continuous methods. As used herein, semi-batch refers to processes in which reactants are added to a polymerization reactor, one or more of which may be added over the course of the reaction, and the finished copolymer is removed as the final product after polymerization has been completed. A batch polymerization refers to processes in which the reactants are all added to the reactor initially and the finished polymer is removed as the final product after polymerization has been completed. A continuous polymerization refers to processes in which all reactants (in a constant relationship to one another) are added to a reactor on a continuous basis and a polymer-reactant stream is removed on a continuous basis at the same rate that reactants are added. As used herein, semi-continuous refers to processes in which, for example, continuous-mode reactors may be connected in series such that the resultant polymer-reactant mixture of each continuous reactor is fed into the next reactor in the series and each continuous reactor may use a different set of conditions representing changes in monomer ratios (such as step function, saw-tooth oscillating), monomer feed rates, initiator to monomer ratios, or initiator feed rates; the resultant polymer product from the last reactor in the series would be similar to a polymer having been produced by operating one reactor in a semi-batch mode. Among the reactor types useful in the practice of the present invention are, for example, pipe (plug-flow), recycle-loop and continuous-feed-stirred-tank (CFSTR) type reactors.

The process of the present invention can be conducted as a cofeed or heel process, and is preferably a combination cofeed-heel process. A cofeed process is one where a major portion of the reactants is metered, or fed, into the reactor over a period of time. When using a cofeed process, the initiator and monomers may be introduced into the reaction mixture as separate streams or as mixtures that may be fed linearly, that is, at constant rates, or at variable rates. The streams may be staggered so that one or more of the streams is completely fed before the others. The monomers may be fed into the reaction mixture as individual streams or combined into one or more streams. A heel process is one where some portion of one or more of the reactants or diluents is present in the polymerization reactor, and the remaining reactants and diluents are then added to the reactor at some later point. A combination of a heel and a cofeed process is one where a portion of one or more of the reactants or diluents is present in the polymerization reactor, and the remainder of the one or more reactants or diluents is metered (including variation of individual monomer feed rates), or fed, into the reactor over a period of time.

The process of the present invention is applicable to preparing copolymers by bulk or solution polymerization techniques. Suspension and emulsion polymerization processes can also benefit from the process of the present invention if adequate transfer of the initiator feed from the continuous phase (usually aqueous based) into the suspension or emulsion particles or dispersed phase (usually water-insoluble) is achieved so that the copolymer composition is substantially represented by the composition of the monomer feeds entering the polymerization reactor.

The process of the present invention is particularly applicable to preparing polymers by solution (aqueous or solvent) polymerization. Preferably, the process of the present invention is applied to solution (solvent) polymerizations by mixing the selected monomers in the presence of a polymerization initiator, a diluent and optionally a chain transfer agent.

Generally, the temperature of the polymerization may be up to the boiling point of the system, for example, from about 60 to 150° C., preferably from 85 to 130° C. and more preferably from 110 to 120° C., although the polymerization can be conducted under pressure if higher temperatures are used. The polymerization (including monomer feed and hold times) is run generally for about 4 to 10 hours, preferably from 2 to 3 hours, or until the desired degree of polymerization has been reached, for example until at least 90%, preferably at least 95% and more preferably at least 97%, of the copolymerizable monomers has been converted to copolymer. As is recognized by those skilled in the art, the time and temperature of the reaction are dependent on the choice of initiator and target molecular weight and can be varied accordingly.

When the process of the present invention is used for solvent (non-aqeuous) poymerizations, initiators suitable for use are any of the well known free-radical-producing compounds such as peroxy, hydroperoxy and azo initiators, including, for example, acetyl peroxide, benzoyl peroxide, lauroyl peroxide, tert-butyl peroxyisobutyrate, caproyl peroxide, cumene hydroperoxide, 1,1-di(tert-butylperoxy)-3,3,5-trimethylcyclohexane, azobisisobutyronitrile and tert-butyl peroctoate (also known as tert-butylperoxy-2-ethylhexanoate). The initiator concentration is typically between 0.025 and 1%, preferably from 0.05 to 0.5%, more preferably from 0.1 to 0.4% and most preferably from 0.2 to 0.3%, by weight based on the total weight of the monomers. In addition to the initiator, one or more promoters may also be used. Suitable promoters include, for example, quaternary ammonium salts such as benzyl(hydrogenated-tallow)-dimethylammonium chloride and amines. Preferably the promoters are soluble in hydrocarbons. When used, these promoters are present at levels from about 1% to 50%, preferably from about 5% to 25%, based on total weight of initiator. Chain transfer agents may also be added to the polymerization reaction to control the molecular weight of the polymer. The preferred chain transfer agents are alkyl mercaptans such as lauryl mercaptan (also known as dodecyl mercaptan, DDM), and the concentration of chain transfer agent used is from zero to about 2%, preferably from zero to 1%, by weight.

When the process of the present invention is used for aqueous phase poymerizations, the initiators suitable for use are any of the conventional water-soluble free-radical initiators and redox couples. Suitable free-radical initiators include, for example, peroxides, persulfates, peresters and azo initiators. Mixed initiator systems (redox couples) can also be used, such as combination of a free radical initiator with a reducing agent. Suitable reducing agents include, for example, sodium bisulfite, sodium sulfite, hypophosphite, isoascorbic acid and sodium formaldehyde-sulfoxylate. The level of initiator is generally 0.1 to 20% based on the total weight of polymerizable monomers. Preferably the initiator is present at a level from 1 to 15% and most preferably from 2 to 10% based on the total weight of polymerizable monomer. In addition to the initiator, one or more promoters may also be used. Suitable promoters include water-soluble salts of metal ions. Suitable metal ions include iron, copper, cobalt, manganese, vanadium and nickel. Preferably the promoters are water-soluble salts of iron or copper. When used, the promoters are present at levels from about 1 to about 100 ppm based on the total amount of polymerizable monomer. Preferably the promoters are present at levels from about 3 to about 20 ppm based on the total polymerizable monomers. It is generally desirable to control the pH of the polymerizing monomer mixture in aqueous phase polymerizations, especially when using thermal initiators such as persulfate salts. The pH of the polymerizing monomer mixture can be controlled by a buffer system or by the addition of a suitable acid or base; the pH of the system is maintained from about 3 to about 10, preferably from about 4 to about 8, and more preferably from about 4 to about 6.5. Similarly, when redox couples are used there will be an optimum pH range in which to conduct the polymerization depending on the choice of the components of the redox couple. The pH of the system can be adjusted to suit the choice of the redox couple by the addition of an effective amount of a suitable acid or base. Any conventional water-soluble chain regulator or chain transfer agent can be used to control molecular weight in aqueous phase polymerizations. Suitable chain regulators include, for example, mercaptans (such as 2-mercaptoethanol and 3-mercaptopropionic acid, for example), hypophosphites, phosphites (such as sodium phosphite, for example), isoascorbic acid, alcohols, aldehydes, hydrosulfites and bisulfites (such as sodium metabisulfite, for example).

When the polymerization is conducted as a solution polymerization using a solvent other than water, the reaction may be conducted at up to about 100% (where the polymer formed acts as its own solvent) or up to about 70%, preferably from 40 to 60%, by weight of polymerizable monomers based on the total reaction mixture. Similarly, when the polymerization is conducted as an aqueous polymerization, the reaction should be conducted at up to about 70%, preferably from 40 to 60%, by weight of polymerizable monomers based on the total reaction mixture. The solvents or water, if used, can be introduced into the reaction vessel as a heel charge, or can be fed into the reactor either as a separate feed stream or as a diluent for one of the other components being fed into the reactor.

Diluents may be added to the monomer mix or they may be added to the reactor along with the monomer feed. Diluents may also be used to provide a solvent heel, preferably non-reactive, for the polymerization, in which case they are added to the reactor before the monomer and initiator feeds are started to provide an appropriate volume of liquid in the reactor to promote good mixing of the monomer and initiator feeds, particularly in the early part of the polymerization. Preferably, materials selected as diluents should be substantially non-reactive towards the initiators or intermediates in the polymerization to minimize side reactions such as chain transfer and the like. The diluent may also be any polymeric material which acts as a solvent and is otherwise compatible with the monomers and polymerization ingredients being used.

Among the diluents suitable for use in the process of the present invention for non-aqueous solution polymerizations are aromatic hydrocarbons (such as benzene, toluene, xylene and aromatic naphthas), chlorinated hydrocarbons (such as ethylene dichloride, chlorobenzene and dichlorobenzene), esters (such as ethyl propionate or butyl acetate), ($C_6$–$C_{20}$) aliphatic hydrocarbons (such as cyclohexane, heptane and octane), petroleum base oils (such as paraffinic and naphthenic oils) or synthetic base oils (such as olefin copolymer (OCP) lubricating oils, for example poly(ethylene-propylene) or poly(isobutylene)). When the concentrate is directly blended into a lubricating base oil, the more preferred diluent is any mineral oil, such as 100 to 150 neutral oil (100 N or 150 N oil), which is compatible with the final lubricating base oil.

In the preparation of lubricating oil additive polymers, the resultant polymer solution, after the polymerization, generally has a polymer content of about 50 to 95% by weight. The polymer can be isolated and used directly in lubricating oil formulations or the polymer-diluent solution can be used in a concentrate form. When used in the concentrate form the polymer concentration can be adjusted to any desirable level with additional diluent. The preferred concentration of polymer in the concentrate is from 30 to 70% by weight. When a polymer prepared by the process of the present invention is added to base oil fluids, whether it is added as pure polymer or as concentrate, the final concentration of the polymer in the formulated fluid is typically from 0.05 to 20%, preferably from 0.2 to 15% and more preferably from 2 to 10%, depending on the specific use application requirements. For example, when the continuously variable-composition copolymers are used to maintain low temperature fluidity in lubricating oils, for example as pour point depressants, the final concentration of the continuously variable-composition copolymer in the formulated fluid is typically from 0.05 to 3%, preferably from 0.1 to 2% and more preferably from 0.1 to 1%; when the continuously variable-composition copolymers are used as VI improvers in lubricating oils, the final concentration in the formulated fluid is typically from 1 to 6% and preferably from 2 to 5%; and when the continuously variable-composition copolymers are used as hydraulic fluid additives, the final concentration in the formulated fluid is typically from 5 to 15% and preferably from 3 to 10%.

The weight-average molecular weight ($M_w$) of polymers prepared by the process of the present invention may be from 5,000 to 2,000,000. Weight-average molecular weights of alkyl (meth)acrylate polymers useful as lubricating oil additives may be from 10,000 to 1,000,000. As the weight-average molecular weights of the polymers increase, they become more efficient thickeners; however, they can undergo mechanical degradation in particular applications and for this reason, polymer additives with $M_w$ above about 500,000 are not suitable because they tend to undergo "thinning" due to molecular weight degradation resulting in loss of effectiveness as thickeners at the higher use temperatures (for example, at 100° C.). Thus, the desired $M_w$ is ultimately governed by thickening efficiency, cost and the type of application. In general, polymeric pour point depressant additives of the present invention have $M_w$ from about 30,000 to about 700,000 (as determined by gel permeation chromatography (GPC), using poly(alkylmethacrylate) standards); preferably, $M_w$ is in the range from 60,000 to 350,000 in order to satisfy the particular use as pour point depressants. Weight-average molecular weights from 70,000 up to 300,000 are preferred.

The polydispersity index of the polymers prepared by the process of the present invention may be from 1 to about 15, preferably from 1.5 to about 4. The polydispersity index ($M_w/M_n$, as measured by GPC, where $M_n$ is number-average molecular weight) is a measure of the narrowness of the molecular weight distribution with higher values representing increasingly broader distributions. It is preferred that the molecular weight distribution be as narrow as possible for polymers used as VI improvers in crankcase and hydraulic fluid applications, but this is generally limited by the method of manufacture. Some approaches to providing narrow molecular weight distributions (low $M_w/M_n$) include, for example, one or more of the following methods: anionic polymerization; continuous-feed-stirred-tank-reactor (CFSTR); low-conversion polymerization; control of temperature or initiator/monomer ratio (such as disclosed in EP 561078 to achieve a constant degree of polymerization) during polymerization; and mechanical shearing, for example homogenization, of the polymer.

Those skilled in the art will recognize that the molecular weights set forth throughout this specification are relative to the methods by which they are determined. For example, molecular weights determined by GPC and molecular weights calculated by other methods, may have different values. It is not molecular weight per se but the handling characteristics and performance of a polymeric additive (shear stability and thickening power under use conditions) that is important. Generally, shear stability is inversely proportional to molecular weight. A VI improving additive with good shear stability (low SSI value, see below) is typically used at higher initial concentrations relative to another additive having reduced shear stability (high SSI value) to obtain the same target thickening effect in a treated fluid at high temperatures; the additive having good shear stability may, however, produce unacceptable thickening at low temperatures due to the higher use concentrations.

Therefore, polymer composition, molecular weight and shear stability of pour point depressant and VI improving additives used to treat different fluids must be selected to achieve a balance of properties in order to satisfy both high and low temperatures performance requirements.

The shear stability index (SSI) can be directly correlated to polymer molecular weight and is a measure of the percent loss in polymeric additive-contributed viscosity due to mechanical shearing and can be determined, for example, by measuring sonic shear stability for a given amount of time according to ASTM D-2603-91 (published by the American Society for Testing and Materials). Depending on the end use application of the lubricating oil, the viscosity is measured before and after shearing for specified time periods to determine the SSI value. In general, higher molecular weight polymers undergo the greatest relative reduction in molecular weight when subjected to high shear conditions and, therefore, these higher molecular weight polymers also exhibit the largest SSI values. Therefore, when comparing the shear stabilities of polymers, good shear stability is associated with the lower SSI values and reduced shear stability with the higher SSI values.

The SSI range for alkyl (meth)acrylate polymers useful as lubricating oil additives (for example: VI improvers, thickeners, pour point depressants, dispersants) prepared by the process of this invention is from about zero to about 60%, preferably from 1 to 40% and more preferably from 5 to 30% and will vary depending upon the end use application; values for SSI are usually expressed as whole numbers, although the value is a percentage. The desired SSI for a polymer can be achieved by either varying synthesis reaction conditions or by mechanically shearing the known molecular weight product polymer to the desired value.

Representative of the types of shear stability that are observed for conventional lubricating oil additives of different $M_w$ are the following: conventional poly (methacrylate) additives having $M_w$ of 130,000, 490,000 and 880,000, respectively, would have SSI values (210° F.) of 0, 5 and 20%, respectively, based on a 2000 mile road shear test for engine oil formulations; based on a 20,000 mile high speed road test for automatic transmission fluid (ATF) formulations, the SSI values (210° F.) were 0, 35 and 50%, respectively; and based on a 100 hour ASTM D-2882-90 pump test for hydraulic fluids, the SSI values (100° F.) were 18, 68, and 76%, respectively (*Effect of Viscosity Index Improver on In-Service Viscosity of Hydraulic Fluids,* R. J. Kopko and R. L. Stambaugh, Fuel and Lubricants Meeting, Houston, Tex., Jun. 3–5, 1975, Society of Automotive Engineers).

Pumpability of an oil at low temperatures, as measured by the mini-rotary viscometer (MRV), relates to viscosity under low shear conditions at engine startup. Since the MRV test is a measure of pumpability, the engine oil must be fluid enough so that it can be pumped to all engine parts after engine startup to provide adequate lubrication. ASTM D-4684-89 deals with viscosity measurement in the temperature range of −10 to −30° C. and describes the TP-1 MRV test. SAE J300 Engine Oil Viscosity Classification (December 1995) allows a maximum of 30 pascal·seconds (pa·sec) or 300 poise at −30° C. for SAE 5W-30 oil using the ASTM D-4684-89 test procedure. Another aspect of low temperature performance measured by the TP-1 MRV test is yield stress (recorded in pascals); the target value for yield stress is "zero" pascals, although any value less than 35 pascals (limit of sensitivity of equipment) is recorded as "zero" yield stress. Yield stress values greater than 35 pascals signify increasing degrees of less desirable performance.

Tables 1, 3 and 4 present viscosity data (useful in predicting low temperature pumpability performance) for polymeric additives prepared by the process of the present invention in comparison with conventional polymer additives (single-composition polymers or physical mixtures of two different single-composition polymers). The data in the tables are Treat Rate (weight % of polymer additive in formulated oil) and the corresponding viscosities and yield stress values at selected low temperatures in different formulated oils. Base oils A and B are representative oils from a catalytically dewaxed process and a solvent extraction dewaxed process, respectively; each base oil being formulated to 10 W-40 and 5 W-30 grade viscosity specifications, respectively. Base oils A and B represent significantly different types of oils regarding the expected ease of satisfying target viscosity specifications for formulated oils with base oil A representing a "difficult to treat" oil and base oil B representing a "readily treated" oil. Base oils A and B were used as part of a screening process to identify and differentiate polymeric additives regarding their relative ability to most closely satisfy the TP-1 MRV specifications of both A and B oils. Low viscosities (below 30 pac·sec) and zero pascal yield stress values represent the desirable target performance.

In Table 1, Polymer #14C represents a single-composition copolymer additive based on 70 LMA/30 SMA and is most directly comparable with Polymer #4 of the present invention for low temperature performance: the two polymers perform similarly in Base Oil A and #4 shows slightly improved performance in Base Oil B compared to #14C. Polymers 12C and 13C represent conventional single-composition (48 LMA/52 CEMA) and a physical mixture of two single-composition additives (overall average of 50 LMA/(35 SMA+15 CEMA), respectively, and are most directly comparable with Polymers #3, #5, #6, #9, #10 and #11 of the present invention for low temperature performance: the two groups of polymers perform similarly in Base Oil A with #3, #6 and #9 showing improved performance compared to the conventional polymers; in Base Oil B, the two groups of polymers perform similarly with #11 showing improved performance compared to the conventional polymers. Higher treat rates (0.18% and 0.36%) for Polymers #3, #9, #10 and 11 show correspondingly improved performance compared to the lower treat rate (0.06%).

In addition to base oils A and B, commercial oils C and D (each at two different viscosity grades) were used to evaluate pumpability performance. The properties of the untreated commercial oils C and D are presented below: pour point according to ASTM D 97 (indicates ability to remain fluid at very low temperatures and is designated as the temperature at which the oil will no longer flow), viscosity index (VI), kinematic and dynamic (ASTM D 5293) bulk viscosity properties.

|  | Commercial Oil C | | Commercial Oil D | |
| --- | --- | --- | --- | --- |
|  | SAE 15W-40 | SAE 20W-50 | SAE 15W-40 | SAE 20W-50 |
| Kinematic Viscosity: | | | | |
| 100° C. ($10^6$ m²/sec) | 14.34 | 18.34 | 14.78 | 19.25 |
| 40° C. ($10^6$ m²/sec) | 112.1 | 165.6 | 117.0 | 178.3 |
| Viscosity Index | 130 | 124 | 130 | 123 |
| ASTM D 97, Temp (° C.) | −9 | −9 | −6 | −9 |
| ASTM D 5293 | | | | |
| Temperature (° C.) | −15 | −10 | −15 | −10 |
| Viscosity (Pa · sec) | 3.54 | 3.37 | 3.92 | 4.61 |

In Table 3, the conventional single-composition copolymer additive (#14C) or mixed conventional additive formulations (#15C and #16C) are compared to Polymer #17, containing a continuously-variable composition copolymer of the present invention. Polymer #17 performs well in both variations of Commercial Oil C, whereas the conventional additive or additive mixtures show variable results in the Commercial Oil C formulations.

In Table 4, the same conventional single-composition copolymer additive and mixed conventional additive formulations as shown in Table 3 are compared to Polymer #17, but as used in Commercial Oil D formulations. Again, #17 performs well in both variations of Commercial Oil D, whereas the conventional additive or additive mixtures show variable results in the Commercial Oil D formulations.

Another measure of low temperature performance of formulated oils, referred to as Scanning Brookfield Viscosity (ASTM 5133), measures the lowest temperatures achievable by an oil formulation before the viscosity exceeds 30.0 pa·sec (or 300 poise). Formulated oils having lower "30 pa·sec temperature" values are expected to maintain their fluidity at low temperatures more readily than other formulated oils having higher "30 pa·sec temperatures;" target values for the different viscosity grade oils are below −30° C. for SAE 5 W-30, below −25° C. for SAE 10 W-40, below −20° C. for SAE 15 W-40 and below −15° C. for SAE 20 W-50 formulated oils. Another aspect of low temperature performance measured by ASTM 5133 is the gel index, based on a dimensionless scale (typically ranging from 3 to 100) that indicates the tendency of the formulated oil to "gel" or "setup" as a function of a decreasing temperature profile at low temperature conditions; low gel index values indicate good low temperature fluidity with target values being less than about 8 to 12 units.

Tables 2, 5 and 6 present Scanning Brookfield Viscosity performance data for polymeric additives prepared by the process of the present invention in comparison with conventional polymer additives (single-composition polymers or physical mixtures of two different single-composition polymers). The data in the tables are Treat Rate (weight % of polymer additive in formulated oil) and the corresponding "30 pa·sec temperatures" and gel index values in different formulated oils. Low "30 pa·sec temperatures" and low gel index values (below 8 to 12 units) represent the desirable target performance.

In Table 2, Polymers 12C and 13C represent conventional single-composition (48 LMA/52 CEMA) and a physical mixture of two single-composition additives (overall average of 50 LMA/(35 SMA+15 CEMA), respectively, and are directly comparable with Polymers #3, #9, #10 and #11 (having similar overall "average" polymer composition) of the present invention for low temperature performance: the two groups of polymers perform similarly in Base Oils A and B with #3 showing slightly improved performance compared to the conventional polymers in Base Oil A; higher treat rates (0.18% and 0.36%) for Polymers #3, #9, #10 and 11 show correspondingly improved performance compared to the lower treat rate (0.06%).

In Tables 5 and 6, the conventional single-composition copolymer additive (#14C) or mixed conventional additive formulations (#15C and #16C) are compared to Polymer #17, containing a continuously-variable composition copolymer of the present invention. Polymer #17 performs well in both variations of Commercial Oils C and D, whereas the conventional additive or additive mixtures demonstrate inferior performance in the Commercial Oils C and D.

Abbreviations used in the Examples and Tables are listed below with the corresponding descriptions; polymer additive compositions are designated by the relative proportions of monomers used. Polymer example identifications (Ex#) followed by "C" refer to comparative examples that are not within the scope of the present invention: Examples 1–11 and 17 represent copolymers prepared by the process of the present invention; examples 12–16 represent conventional polymers or conventional polymer mixtures for comparative purposes.

MMA=Methyl Methacrylate
LMA=Lauryl-Myristyl Methacrylate Mixture
IDMA=Isodecyl Methacrylate
DPMA=Dodecyl-Pentadecyl Methacrylate Mixture
SMA=Cetyl-Stearyl Methacrylate Mixture
CEMA=Cetyl-Eicosyl Methacrylate Mixture
HPMA=Hydroxypropyl Methacrylate
DDM=Dodecyl Mercaptan
SSI=Shear Stability Index
NM=Not Measured

TABLE 1

Pumpability Test (TP-1 MRV)

| Ex # | Treat Rate | Base Oil A SAE 10W-40 | | Base Oil B SAE 5W-30 | |
|---|---|---|---|---|---|
| | | −25° C. Viscosity (Pa · sec) | −25° C. Yield Stress, Pa | −30° C. Viscosity (Pa · sec) | −30° C. Yield Stress, Pa |
| oil | 0.00 | 148.0 | 315 | 34.2 | 105 |
| 1 | 0.06 | solid | NM | 8.0 | 0 |
| 2 | 0.06 | solid | NM | 7.5 | 0 |
| 3 | 0.06 | 63.4 | 140 | 19.8 | 70 |
| 3 | 0.18 | 15.2 | 0 | 13.8 | 0 |
| 4 | 0.06 | solid | NM | 7.9 | 0 |
| 5 | 0.06 | 258.9 | NM | 16.3 | 0 |
| 6 | 0.06 | 131.1 | NM | 17.5 | 0 |
| 9 | 0.06 | 93.3 | 140 | 16.2 | 0 |
| 9 | 0.18 | 11.0 | 0 | 14.1 | 0 |
| 10 | 0.06 | solid | NM | 12.3 | 0 |
| 10 | 0.18 | solid | NM | 9.8 | 0 |
| 10 | 0.36 | solid | NM | 9.1 | 0 |
| 11 | 0.06 | solid | NM | 9.8 | 0 |
| 11 | 0.18 | 114.5 | 175 | 8.6 | 0 |
| 11 | 0.36 | 128.7 | 245 | 9.3 | 0 |
| 12C | 0.06 | 151.8 | 175 | 17.2 | 0 |
| 13C | 0.06 | solid | NM | 11.5 | 0 |
| 14C | 0.06 | solid | NM | 8.7 | 0 |

TABLE 2

Scanning Brookfield Viscosity (ASTM D 5133)

| Ex# | Treat Rate | Base Oil A SAE 10W-40 | | Base Oil B SAE 5W-30 | |
|---|---|---|---|---|---|
| | | ° C. for 30.0 Pa · sec | Gel Index | ° C. for 30.0 Pa · sec | Gel Index |
| 3 | 0.06 | −16.4 | 45 | −32.4 | 6.5 |
| 3 | 0.18 | −28.7 | 7.9 | −31.4 | 5.5 |
| 9 | 0.06 | −13.9 | 55 | −32.4 | 5.3 |
| 9 | 0.18 | −27.9 | 11.5 | NM | NM |
| 10 | 0.06 | −12.0 | 43 | −33.0 | 5.4 |
| 10 | 0.18 | −13.8 | 49 | −32.7 | 4.6 |
| 10 | 0.36 | −16.5 | 38 | −31.2 | 4.4 |
| 11 | 0.06 | −12.1 | 44 | −33.9 | 5.0 |
| 11 | 0.18 | −13.5 | 57 | −32.8 | 6.1 |
| 11 | 0.36 | −15.7 | 51 | −31.3 | 7.9 |
| 12C | 0.06 | −13.4 | 61 | −32.3 | 5.6 |
| 13C | 0.06 | −12.2 | 32 | −33.3 | 5.5 |

TABLE 3

Pumpability Test (TP-1 MRV)

| Ex# | Treat Rate | Commercial Oil C SAE 15W-40 | | Commercial Oil C SAE 20W-50 | |
|---|---|---|---|---|---|
| | | −20/−25° C. Viscosity (Pa · sec) | −20/−25° C. Yield Stress, Pa | −15/−20° C. Viscosity (Pa · sec) | −15/−20° C. Yield Stress, Pa |
| 14C | 0.08 | 70.3/solid | 140/NM | NM | NM |
| 14C | 0.12 | NM | NM | NM/solid | NM |
| 15C | 0.06 | 32.1/87.4 | 0/210 | NM | NM |
| 15C | 0.09 | NM | NM | NM/50.4 | NM/210 |
| 16C | 0.18 | 9.2/21.0 | 0/0 | 9.9/20.0 | 0/0 |
| 16C | 0.12 | 22.0/84.9 | 0/105 | NM | NM |
| 17 | 0.18* | 10.6/25.9 | 0/0 | 9.9/21.8 | 0/0 |

* = 0.12% polymer from Ex #3 and 0.06% conventional 94 LMA/6 SMA polymer

TABLE 4

Pumpability Test (TP-1 MRV)

| Ex# | Treat Rate | Commercial Oil D SAE 15W-40 | | Commercial Oil D SAE 20W-50 | |
|---|---|---|---|---|---|
| | | −20/−25° C. Viscosity (Pa · sec) | −20/−25° C. Yield Stress, Pa | −15/−20° C. Viscosity (Pa · sec) | −15/−20° C. Yield Stress, Pa |
| 14C | 0.08 | NM/solid | NM | NM | NM |
| 15C | 0.06 | NM/solid | NM | NM | NM |

TABLE 4-continued

Pumpability Test (TP-1 MRV)

| | | Commercial Oil D SAE 15W-40 | | Commercial Oil D SAE 20W-50 | |
|---|---|---|---|---|---|
| Ex# | Treat Rate | −20/−25° C. Viscosity (Pa · sec) | −20/−25° C. Yield Stress, Pa | −15/−20° C. Viscosity (Pa · sec) | −15/−20° C. Yield Stress, Pa |
| 16C | 0.18 | 77.2/solid | 140/NM | 13.4/28.7 | 0/0 |
| 16C | 0.12 | NM/27.7 | NM/0 | NM | NM |
| 17 | 0.18* | 12.3/29.6 | 0/0 | 13.8/27.9 | 0/0 |

* = 0.12% polymer from Ex #3 and 0.06% conventional 94 LMA/6 SMA polymer

TABLE 5

Scanning Brookfield Viscosity (ASTM D 5133)

| | | Commercial Oil C SAE 15W-40 | | Commercial Oil C SAE 20W-50 | |
|---|---|---|---|---|---|
| Ex# | Treat Rate | ° C. for 30.0 Pa · sec | Gel Index | ° C. for 30.0 Pa · sec | Gel Index |
| 16C | 0.18 | −24.3 | 9.5 | −16.9 | 17.2 |
| 17 | 0.18* | −26.0 | 4.5 | −19.3 | 6.9 |

* = 0.12% polymer from Ex #3 and 0.06% conventional 94 LMA/6 SMA polymer

TABLE 6

Scanning Brookfield Viscosity (ASTM D 5133)

| | | Commercial Oil D SAE 15W-40 | | Commercial Oil D SAE 20W-50 | |
|---|---|---|---|---|---|
| Ex# | Treat Rate | ° C. for 30.0 Pa · sec | Gel Index | ° C. for 30.0 Pa · sec | Gel Index |
| 14C | 0.08 | −11.4 | 25.9 | NM | NM |
| 15C | 0.06 | −13.4 | 25.1 | NM | NM |
| 15C | 0.09 | NM | NM | −15.7 | 12.3 |
| 16C | 0.18 | NM | NM | −20.1 | 5.3 |
| 16C | 0.12 | −21.5 | 17.4 | NM | NM |
| 17 | 0.18* | −24.1 | 5.9 | −19.3 | 4.7 |

* = 0.12% polymer from Ex #3 and 0.06% conventional 94 LMA/6 SMA polymer

Table 7 summarizes the process variables used to prepare copolymers using the process of the present invention. Overall average composition refers to the final copolymer composition based on the total amount of X and Y monomers used during the polymerization; the range for the X monomer is also provided to illustrate the compositional breadth of single-composition copolymers within each continuously-variable copolymer prepared. For example, Polymers #9, #10 and #11 all represent 50 X/50 Y continuously variable-composition copolymers, but each was produced by significantly different variations within the scope of the process of the present invention. Table 7A provides data for initial X and Y monomer concentrations in the reactor and the maximum differential in concentration of X and Y monomer components during the polymerization. Conventional Polymer #12C is included in Tables 7 and 7A to illustrate the contrast in process variables versus Polymers #1–11; for example, Polymer #12C has a maximum $[X_i-X_T]$ or $[Y_i-Y_T]$ value of "zero," indicating a single-composition copolymer, whereas Polymers #1–11 have $[X_i-X_T]$ or $[Y_i-Y_T]$ values ranging from 10 to 100.

TABLE 7

Process Parameters: Continuously Variable-Composition Copolymers

| Ex # | $X_1$ | $X_2$ | $Y_1$ | $Y_2$ | Overall Aver Comp (X/Y) | Range (X) |
|---|---|---|---|---|---|---|
| 1 | 70 | 100 | 30 | 0 | 80/20 | 70 → 90 |
| 2 | 90 | 60 | 10 | 40 | 80/20 | 90 → 70 |
| 3 | 30 | 70 | 70 | 30 | 50/50 | 30 → 70 |
| 4 | 55 | 85 | 45 | 15 | 70/30 | 55 → 85 |
| 5 | 30 | 40 | 70 | 60 | | |
| | 40 ($X_2$) | 50 ($X_3$) | 60 ($Y_2$) | 50 ($Y_3$) | | |
| | 50 ($X_3$) | 60 ($X_4$) | 50 ($Y_2$) | 40 ($Y_4$) | 50/50 | 30 → 70 |
| | 60 ($X_4$) | 70 ($X_5$) | 40 ($Y_2$) | 30 ($Y_5$) | | |
| 6 | 30 | 35 | 70 | 65 | | |
| | 35 ($X_2$) | 40 ($X_3$) | 65 ($Y_2$) | 60 ($Y_3$) | | |
| | 40 ($X_3$) | 45 ($X_4$) | 60 ($Y_3$) | 55 ($Y_4$) | | |
| | 45 ($X_4$) | 50 ($X_5$) | 55 ($Y_4$) | 50 ($Y_5$) | | |
| | 50 ($X_5$) | 55 ($X_6$) | 50 ($Y_5$) | 45 ($Y_6$) | | |
| | 55 ($X_6$) | 60 ($X_7$) | 45 ($Y_6$) | 40 ($Y_7$) | | |
| | 60 ($X_7$) | 65 ($X_8$) | 40 ($Y_7$) | 35 ($Y_8$) | 50/50 | 30 → 70 |
| | 65 ($X_8$) | 70 ($X_9$) | 35 ($Y_8$) | 30 ($Y_9$) | | |
| 7 | 45 | 55 | 20 | 10 | 50/15 | 45 → 55 |
| 8 | 80 | 96 | 20 | 4 | 86/14 | 80 → 91 |
| 9 | 100 | 0 | 0 | 100 | 50/50 | 30 → 70 |
| 10 | 0 | 100 | 100 | 0 | 50/50 | 0 → 100 |
| 11 | 100 | 0 | 0 | 100 | 50/50 | 100 → 0 |
| 12C | 48 | — | 52 | — | 48/52 | 48 → 48 |

X and Y are LMA and SMA, respectively in the above table, except for:
Ex #7 where X = IDMA and Y = MMA; Ex #8 where Y = MMA; Ex #12 where Y = CEMA

TABLE 7A

Process Parameters: Continuously Variable-Composition Copolymers

| Ex # | $X_i$ | Max $[X_i - X_T]$ | $Y_i$ | Max $[Y_i - Y_T]$ |
|---|---|---|---|---|
| 1 | 70 | 20 | 30 | 20 |
| 2 | 90 | 20 | 10 | 20 |
| 3 | 30 | 40 | 70 | 40 |
| 4 | 55 | 30 | 45 | 30 |
| 5 | 30 | 40 | 70 | 40 |
| 6 | 30 | 40 | 70 | 40 |
| 7 | 45 | 10 | 20 | 10 |
| 8 | 80 | 11 | 20 | 11 |
| 9 | 30 | 40 | 70 | 40 |
| 10 | 0 | 100 | 100 | 100 |
| 11 | 100 | 100 | 0 | 100 |
| 12C | 48 | 0 | 52 | 0 |

Some embodiments of the invention are described in detail in the following Examples. All ratios, parts and percentages (%) are expressed by weight unless otherwise specified, and all reagents used are of good commercial quality unless otherwise specified. Examples 1 through 11 provide information for preparing polymers using the process to the present invention and Tables 1–6 give performance data on lubricating oil formulations containing the polymers.

EXAMPLE 1

Preparation of Pour Point Depressant 1

To a nitrogen-flushed reactor were charged 160 parts of a 100N polymerization oil (having bromine number=less than 12). The oil was heated to the desired polymerization temperature of 120° C. Two separate monomer mixtures were prepared: mix 1 contained 574.36 parts of LMA (70%), 248.7 parts of SMA (30%) and 64 parts of 100N polymerization oil and was placed in a stirred addition vessel that was connected to the polymerization reactor by a transfer line; mix 2 was composed of 820.51 parts of LMA (100%) and 64 parts of 100N polymerization oil. Mix 2 was pumped into the stirred addition vessel containing mix 1 at exactly the same rate at which the contents of the addition vessel were pumped into the reactor. At the same time that the monomer mixes were pumped to the polymerization reactor and stirred addition vessel, a solution of tert-butyl peroctoate initiator (20% in 100N polymerization oil) was fed to the reactor at a rate calculated to provide a degree of polymerization equal to 200 (see EP 561078, ibid.). At the end of 90 minutes (min.) all of monomer mix 2 had been pumped into the addition vessel containing mix 1 and the monomer feed to the reactor was terminated; approximately 810 parts monomer mix had been added to the reactor. The remaining monomer mix in the addition vessel (approximately 90 LMA/10 SMA) was retained for use as a monomer mix in a separate polymerization (alternatively, some portion or all of the remaining monomer mix could be added to the reactor, in which case the final polymer would consist of approximately 10–50% of the 90 LMA/10 SMA single-composition copolymer and approximately 50–90% of the 70 LMA/30 SMA→90 LMA/10 SMA continuously variable-composition copolymer). The initiator feed was continued for an additional 90 min. at which time the calculated conversion was 97% and the total amount of initiator solution which had been fed was 36.2 milliliters (ml). The reaction solution was stirred for an additional 30 min. after which an additional 200 parts of 100N polymerization oil was added, and after an additional 30 min. of mixing, was transferred from the reactor. The product contained 60.6% polymer solids which represented a 96.6% conversion of monomers to polymer. The composition of materials formed began at 70% LMA, 30% SMA and ended at about 90% LMA, 10% SMA.

EXAMPLE 2

Preparation of Pour Point Depressant 2

In a manner similar to that described in Example 1, except as noted, a pour point depressant polymer solution was prepared. Monomer mix 1 contained 738.46 parts of LMA (90%), 82.9 parts of SMA (10%) and 64 parts of 100N polymerization oil; mix 2 contained 492.31 parts of LMA (60%), 331.61 parts of SMA (40%) and 64 parts of 100N polymerization oil. The remaining monomer mix in the addition vessel (approximately 70 LMA/30 SMA) was retained for use as a monomer mix in a separate polymerization. The amount of initiator feed was 37.7 ml and the calculated conversion at the end of the initiator feed was 97%. The product contained 60.1% polymer solids which represented a 95.9% conversion of monomers to polymer. The composition of materials formed began at 90% LMA, 10% SMA and ended at about 70% LMA, 30% SMA.

EXAMPLE 3

Preparation of Pour Point Depressant 3

To a nitrogen-flushed reactor were charged 160 parts of a 100N polymerization oil (having bromine number less than 12). The oil was heated to the desired polymerization temperature of 115° C. Two separate monomer mixtures were prepared: mix 1 contained 123.08 parts of LMA (30%), 290.16 parts of SMA (70%), 2.20 parts of DDM and 1.16 parts of tert-butyl peroctoate solution (50% in odorless mineral spirits) and was placed in a stirred addition vessel that was connected to the polymerization reactor by a transfer line; mix 2 contained 287.18 parts of LMA (70%), 124.35 parts of SMA (30%), 2.20 parts of DDM and 1.16 parts of tert-butyl peroctoate solution (50% in odorless mineral spirits). Mix 2 was pumped into the stirred addition vessel containing mix 1 at exactly one-half the rate at which the contents of the addition vessel were pumped into the reactor. There was no separate addition of initiator to the reactor. Completion of the monomer feeds required 90 min. The reactor contents were maintained at 115° C. for an additional 30 min. after which a solution of 2 parts tert-butyl peroctoate solution (50% in odorless mineral spirits) in 80 parts 100N polymerization oil was added over 60 min. The reaction solution was stirred for an additional 30 min. after which 219 parts of 100N polymerization oil was added, and after an additional 30 min. of mixing, was transferred from the reactor. The product contained 61.2% polymer solids which represented a 98.8% conversion of monomers to polymer. The composition of materials formed began at 30% LMA, 70% SMA and ended at about 70% LMA, 30% SMA. The polymer had $M_n$ of 30,300.

EXAMPLE 4

Preparation of Pour Point Depressant 4

In a manner similar to that described in Example 3, except as noted, a pour point depressant polymer solution was prepared. Monomer mix 1 contained 225.64 parts of LMA (55%), 186.53 parts of SMA (45%), 2.20 parts of DDM and 1.16 parts of tert-butyl peroctoate solution (50% in odorless mineral spirits); mix 2 contained 348.72 parts of LMA (85%), 62.18 parts of SMA (15%), 2.20 parts of DDM and 1.16 parts of tert-butyl peroctoate solution (50% in odorless mineral spirits) and 64 parts of 100N polymerization oil. The product contained 60.6% polymer solids which represented a 97.9% conversion of monomers to polymer. The composition of materials formed began at 55% LMA, 45% SMA and ended at about 85% LMA, 15% SMA.

EXAMPLE 5

Preparation of Pour Point Depressant 5

Five separate monomer mixes were prepared: Mix 1 contained 30.77 parts LMA (30%), 72.74 parts SMA (70%), 0.3 part of tert-butyl peroctoate solution (50% in odorless mineral spirits) and 0.55 part DDM; Mix 2 contained 41.03 parts LMA (40%), 62.18 parts SMA (60%), 0.3 part of tert-butyl peroctoate solution (50% in odorless mineral spirits) and 0.55 part DDM; Mix 3 contained 51.28 parts LMA (50%), 51.58 parts of SMA (50%), 0.3 part of tert-butyl peroctoate solution (50% in odorless mineral spirits) and 0.55 part DDM; Mix 4 contained 61.54 parts LMA (60%), 41.45 parts SMA (40%), 0.3 part of tert-butyl peroctoate solution (50% in odorless mineral spirits) and 0.55 part DDM; Mix 5 contained 71.79 parts LMA (70%), 31.09 parts SMA (30%), 0.3 part of tert-butyl peroctoate solution (50% in odorless mineral spirits) and 0.55 part DDM. Mix 1 and 100 parts of 100N polymerization oil (having bromine number=less than 12) were added to a nitrogen-flushed polymerization reactor and heated to 115° C. The reactor contents were held at this temperature for 10 min. followed by the rapid addition of mix 2. The reactor contents were maintained at 115° C. for 15 min, followed by the addition of mix 3, followed by another 15 min. hold, then addition of mix 4, followed by another 15 min. hold, then addition of mix 5, followed by another 15 min. hold. Each monomer mix addition required about 5 min. After the final 15 min. hold, 1.25 parts tert-butyl peroctoate solution (50% in odorless mineral spirits) in 50 parts of 100N polymerization oil was added at a uniform rate over 50 min. The reaction solution was stirred for 15 min., then diluted with 135 parts of 100N polymerization oil, and after an additional 15 min. of mixing, the reaction solution was transferred from the reactor. The product contained 60.1% polymer solids which represented a 96.9% conversion of monomers to polymer.

EXAMPLE 6

Preparation of Pour Point Depressant 6

Nine separate monomer mixes were prepared: Mix 1 contained 17.1 parts LMA (30%), 40.3 parts SMA (70%), 0.17 part tert-butyl peroctoate solution (50% in odorless mineral spirits) and 0.3 part DDM; Mix 2 contained 19.94 parts LMA (35%), 37.42 parts SMA (65%), 0.17 tert-butyl peroctoate solution (50% in odorless mineral spirits) and 0.3 part DDM; Mix 3 contained 22.79 parts LMA(40%), 34.55 parts SMA (60%), 0.17 tert-butyl peroctoate solution (50% in odorless mineral spirits) and 0.3 part DDM; Mix 4 contained 25.64 parts LMA (45%), 31.67 parts SMA (55%), 0.17 part tert-butyl peroctoate solution (50% in odorless mineral spirits) and 0.3 part DDM; Mix 5 contained 28.49 parts LMA (50%), 28.79 parts SMA (50%), 0.17 part tert-butyl peroctoate solution (50% in odorless mineral spirits) and 0.3 part DDM; Mix 6 contained 31.34 parts LMA (55%), 25.91 parts SMA (45%), 0.17 part tert-butyl peroctoate solution (50% in odorless mineral spirits) and 0.3 part DDM; Mix 7 contained 34.19 parts LMA (60%), 23.03 parts SMA (40%), 0.17 part tert-butyl peroctoate solution (50% in odorless mineral spirits) and 0.3 part DDM; Mix 8 contained 37.04 parts LMA (65%), 20.15 parts SMA (35%), 0.17 part tert-butyl peroctoate solution (50% in odorless mineral spirits) and 0.3 part DDM; Mix 9 contained 39.89 parts LMA (70%), 17.27 parts SMA (30%), 0.17 part tert-butyl peroctoate solution (50% in odorless mineral spirits) and 0.3 part DDM. Mix 1 and 100 parts of 100N polymerization oil (having bromine number=less than 12) were added to a nitrogen-flushed polymerization reactor and heated to 115° C. The reactor contents were held at this temperature for 10 min. followed by the rapid addition of mix 2. The reactor contents were maintained at 115° C. for 15 min, followed by the addition of each of the mixes (3 through 9), each monomer mix addition followed by another 15 min. hold. Each monomer mix addition required about 5 min. After the final 15 min. hold, 2.0 parts tert-butyl peroctoate solution (50% in odorless mineral spirits) in 50 parts of 100N polymerization oil was added at a uniform rate over 50 min. The reaction solution was stirred for 15 min., then diluted with 135 parts of 100N polymerization oil, and after an additional 15 min. of mixing, the reaction solution was transferred from the reactor. The product contained 60% polymer solids which represented a 96.8% conversion of monomers to polymer.

EXAMPLE 7

Preparation of a Dispersant Viscosity Index Improver

To a nitrogen-flushed reactor were charged 176 parts of a 100N polymerization oil (having bromine number less than 12), 1.38 parts of a 25% solution of benzyl(hydrogenated-tallow)dimethylammonium chloride in mixed butanols and 0.1 part of cumene hydroperoxide. The oil was heated to the desired polymerization temperature of 115° C. Two separate monomer mixtures were prepared: mix 1 contained 183.67 parts of IDMA (45%), 126.32 parts of CEMA (30%), 80 parts of MMA (20%), 20 parts of HPMA (5%) and 0.32 part of cumene hydroperoxide and was placed in a stirred addition vessel that was connected to the polymerization reactor by a transfer line; mix 2 contained 224.49 parts of IDMA (55%), 126.32 parts of CEMA (30%), 40 parts of MMA (10%), 20 parts of HPMA (5%) and 0.32 part of cumene hydroperoxide. Mix 2 was pumped into the stirred addition vessel containing mix 1 at exactly one-half the rate at which the contents of the addition vessel were pumped into the reactor. Completion of the monomer feeds required 90 min. The reactor contents were maintained at 115° C. for an additional 30 min. after which a solution of 0.22 part of cumene hydroperoxide in 6 parts of 100N polymerization oil, followed by 0.46 part of a 25% solution of benzyl (hydrogenated-tallow)-dimethylammonium chloride in mixed butanols in 6 parts of 100N polymerization oil was added. Thirty minutes later a second pair of initiator solutions identical to the above was added and 30 minutes later, a third pair of initiator solutions, identical to the first two, was added. The reaction solution was stirred for an additional 30 min. after which 600 parts of 100N polymerization oil was added, and after an additional 30 min. of mixing, was transferred from the reactor. The product contained 47.0% polymer solids which represented a 96.1% conversion of monomers to polymer. The overall average composition of the final polymer was 50% IDMA/30% CEMA/15% MMA/5% HPMA. The SSI of the polymer was 41.3.

EXAMPLE 8

Preparation of a Hydraulic Fluid Viscosity Index Improver

In a manner similar to that described in Example 1, except as noted, a VI improver polymer solution was prepared. The polymerization temperature was 115° C. Monomer mix 1 contained 664.62 parts of LMA (80%), 152.23 parts of MMA (20%) and 64 parts of 100N polymerization oil; mix 2 contained 787.69 parts of LMA (96%), 32.5 parts of MMA (4%) and 64 parts of 100N polymerization oil. The monomer feeds required a total of 93 min. The remaining monomer mix in the addition vessel (approximately 90 LMA/10 MMA) was retained for use as a monomer mix in a separate polymerization. The initiator feed required 93 min. The amount of initiator feed was 38.0 ml and the calculated conversion at the end of the initiator feed was 97%. After stirring the reaction solution for an additional 30 min., an additional 22.1 parts of 100N polymerization oil was added, and after an additional 30 min. of mixing, the reaction solution was transferred from the reactor. The product contained 70.7% polymer solids which represented a 96.8% conversion of monomers to polymer. The composition of materials formed began at 80% LMA, 20% MMA and ended at about 91% LMA, 9% MMA.

EXAMPLE 9

Preparation of Pour Point Depressant 9

To a nitrogen-flushed 3-liter, stainless steel reactor were charged 268.1 parts of 100N polymerization oil (having bromine number less than 12). The oil was heated to the desired polymerization temperature of 120° C. Two separate monomer mixtures were prepared: mix 1 contained 1033.8 parts LMA, 6.05 parts of DDM and 4.03 parts of tert-butyl peroctoate solution (50% in odorless mineral spirits); mix 2 contained 1044.6 parts SMA, 6.05 parts of DDM and 4.03 parts of tert-butyl peroctoate solution (50% in odorless mineral spirits). Monomer mixes 1 and 2 were each separately pumped into the 3-liter reactor at feed rates such that the initial weight ratio of mix 1/mix 2 fed to the reactor was 30/70 and thereafter the individual feed rates were adjusted to correspond to a continuous change in the mix 1/mix 2 ratio such that the final ratio was 70/30 at the completion of the monomer feed (90 min. total). During the 90 min. feed of monomer mixes 1 and 2, the total feed rate was gradually increased during the first 20 minutes, held at a constant total feed rate for the next 40 minutes, and then gradually reduced to zero over the next 30 minutes. The reactor contents were then cooled to 110° C. and maintained at that temperature for an additional 30 min., after which a solution of 6.05 parts tert-butyl peroctoate solution (50% in odorless mineral spirits) was added over 30 min. The reaction solution was stirred for an additional 30 min., then cooled and transferred from the reactor. Near infrared analysis indicated 97.1% conversion of monomer to polymer at the end of the high temperature hold period. The product solution contained 79.1% polymer solids (by dialysis), corresponding to 94.1% monomer conversion. The polymer had $M_w$ of 74,800, $M_n$ of 19,500 and a polydispersity index of 3.84.

EXAMPLE 10

Preparation of Pour Point Depressant 10

In a manner similar to that described in Example 3 a pour point depressant polymer was prepared using 100% SMA/0% LMA (monomer mix 1) in the initial monomer mix fed to the polymerization reactor while monomer mix 2 (0% SMA/100% LMA) was continuously fed into the monomer mix 1 being fed to the reactor over the course of the polymerization. The composition of materials formed began at 100% SMA and ended at about 100% LMA.

EXAMPLE 11

Preparation of Pour Point Depressant 11

In a manner similar to that described in Example 3 a pour point depressant polymer was prepared using 100% LMA/0% SMA (monomer mix 1) in the initial monomer mix fed to the polymerization reactor while monomer mix 2 (100% SMA/0% LMA) was continuously fed into the monomer mix 1 being fed to the reactor over the course of the polymerization. The composition of materials formed began at 100% LMA and ended at about 100% SMA.

EXAMPLE 12 (Comparative)

Conventional Polymerization Process

A monomer mix was prepared containing 1143.46 parts of CEMA (52%), 1033.85 parts of LMA (48%), 2.94 parts of tert-butyl peroctoate solution (50% in odorless mineral spirits) and 12.60 parts of DDM. Sixty percent of this mix, 1315.71 parts, was charged to a nitrogen-flushed reactor. The reactor was heated to a desired polymerization temperature of 110° C. and the remainder of the monomer mix was fed to the reactor at a uniform rate over 60 minutes. Upon completion of the monomer feed the reactor contents were held at 110° C. for an additional 30 min., then 5.88 parts of tert-butyl peroctoate solution (50% in odorless mineral spirits) dissolved in 312.2 parts of 100N polymerization oil were fed to the reactor at a uniform rate over 60 min. The reactor contents were held for 30 min. at 110° C. and then diluted with 980 parts of 100N polymerization oil. The reaction solution was stirred for an additional 30 min. and then transferred from the reactor. The resultant solution contained 60.2% polymer solids which represented a 97.8% conversion of monomer to polymer.

EXAMPLE 13 (Comparative)

Physical Mixture of Two Conventional Polymers

In a manner similar to that described in Example 12, two pour point depressant polymers having the following compositions were prepared: 30 LMA/70 SMA and 70 LMA/30 CEMA, respectively. Approximately equal parts of each of the polymers were then combined to provided a 50/50 mixture; this physical mixture was then evaluated for low temperature performance. Overall "average" composition of the mixture was 50/50//LMA/(35 SMA+15 CEMA).

EXAMPLES 14–16 (Comparative)

Conventional Polymers

In a manner similar to that described in Example 12, individual pour point depressant polymers were prepared and then evaluated separately or combined in various ratios for low temperature performance.

14=70 LMA/30 CEMA single-composition copolymer

15=48/52 mixture of 70 LMA/30 CEMA single-composition copolymer and 55 LMA/45 CEMA single-composition copolymer. Overall "average" composition of the mixture was 62 LMA/38 CEMA.

16=50/50 mixture of 85 LMA/15 CEMA single-composition copolymer and 55 LMA/45 CEMA single-composition copolymer. Overall "average" composition of the mixture was 70 LMA/30 CEMA.

EXAMPLE 17

Continuously Variable-Composition/Conventional Polymer Blend

The polymer solution of Example 3 was combined with a polymer solution of 94 LMA/6 SMA single-composition copolymer (prepared in similar manner to that described in Example 12) in a 65/35 weight ratio. Overall "average" composition of the mixture was 65 LMA/35 SMA.

We claim:

1. A process for preparing continuously variable-composition copolymers comprising:
    (a) forming a first reaction mixture comprising a monomer-containing phase in which two or more copolymerizable monomers are present in a weight percent ratio from $X_1/Y_1$ to $Y_1/X_1$;
    (b) forming one or more additional reaction mixtures comprising a monomer-containing phase in which two or more copolymerizable monomers are present in a weight percent ratio from $X_n/Y_n$ to $Y_n/X_n$;
    (c) initiating a free-radical addition polymerization by gradual addition of the first reaction mixture or a mixture of the first reaction mixture with the one or more additional reaction mixtures to a reactor under polymerization conditions;
    (d) continuing the polymerization by gradual addition of the one or more additional reaction mixtures
        (i) to the reactor or
        (ii) to the first reaction mixture being added to the reactor at a point prior to where the first reaction mixture is added to the reactor; and
    (e) maintaining polymerization conditions until at least 90% of the two or more copolymerizable monomers has been converted to copolymer;
    wherein $X_1$ and $Y_1$ represent weight percents of any two X and Y monomers of the two or more copolymerizable monomers in the first reaction mixture;

wherein $X_n$ and $Y_n$ represent weight percents of any two X and Y monomers of the two or more copolymerizable monomers in the one or more additional reaction mixtures;

$X_1$, $X_n$, $Y_1$ and $Y_n$ have values from zero to 100 percent;

n represents successive integers from 2 to 10 corresponding to each of the one or more additional reaction mixtures containing the analogous $X_n$ and $Y_n$ weight percents;

the maximum value of n represents the total number of reaction mixtures use in the process;

wherein the gradual addition of the one or more additional reaction mixtures in step (d) is conducted such that at least one of $[X_i-X_T]$ or $[Y_i-Y_T]$ absolute values in the reactor is at least 5 percent and $X_i$, $X_T$, $Y_i$ and $Y_T$ represent instantaneous weight percents of any two X and Y monomers added to the reactor initially ($X_i$ and $Y_i$) and at some time later in the polymerization ($X_T$ and $Y_T$)

and wherein said copolymer has a weight average molecular weight from 10,000 to 1,000,000; and said copolymer is soluble in a lubricating oil.

2. The process of claim 1 wherein step (d) is conducted such that the $[X_i-X_T]$ or $[Y_i-Y_T]$ absolute values are from 20 to 50 percent.

3. The process of claim 1 wherein step (d) is conducted such that at least four different single-composition copolymers are produced during the polymerization and no single-composition copolymer represents more than 50 weight percent of the variable-composition copolymer.

4. The process of claim 1 wherein step (d) is conducted such that no single-composition copolymer represents more than 20 weight percent of the variable-composition copolymer.

5. A continuously variable-composition copolymer prepared by:
  (a) forming a first reaction mixture comprising a monomer-containing phase in which two or more copolymerizable monomers are present in a weight percent ratio from $X_1/Y_1$ to $Y_1/X_1$;
  (b) forming one or more additional reaction mixtures comprising a monomer-containing phase in which two or more copolymerizable monomers are present in a weight percent ratio from $X_n/Y_n$ to $Y_n/X_n$;
  (c) initiating a free-radical addition polymerization by gradual addition of the first reaction mixture or a mixture of the first reaction mixture with the one or more additional reaction mixtures to a reactor under polymerization conditions;
  (d) continuing the polymerization by gradual addition of the one or more additional reaction mixtures
    (i) to the reactor or
    (ii) to the first reaction mixture being added to the reactor at a point prior to where the first reaction mixture is added to the reactor; and
  (e) maintaining polymerization conditions until at least 90% of the two or more copolymerizable monomers has been converted to copolymer;

wherein $X_1$ and $Y_1$ represent weight percents of any two X and Y monomers of the two or more copolymerizable monomers in the first reaction mixture;

wherein $X_n$ and $Y_n$ represent weight percents of any two X and Y monomers of the two or more copolymerizable monomers in the one or more additional reaction mixtures;

$X_1$, $X_n$, $Y_1$ and $Y_n$ have values from zero to 100 percent;

n represents successive integers from 2 to 10 corresponding to each of the one or more additional reaction mixtures containing the analogous $X_n$ and $Y_n$ weight percents;

the maximum value of n represents the total number of reaction mixtures use in the process;

wherein the gradual addition of the one or more additional reaction mixtures in step (d) is conducted such that at least one of $[X_i-X_T]$ or $[Y_i-Y_T]$ absolute values in the reactor is at least 5 percent and $X_i$, $X_T$, $Y_i$ and $Y_T$ represent instantaneous weight percents of any two X and Y monomers added to the reactor initially ($X_i$ and $Y_i$) and at some time later in the polymerization ($X_T$ and $Y_T$)

and wherein said copolymer has a weight average molecular weight from 10,000 to 1,000,000; and said copolymer is soluble in a lubricating oil.

6. The variable-composition copolymer of claim 5 wherein the copolymerizable monomers are selected from one or more of vinylaromatic monomers, nitrogen-containing ring compound monomers, α-olefins, vinyl alcohol esters, vinyl halides, vinyl nitriles, (meth)acrylic acid derivatives, maleic acid derivatives and fumaric acid derivatives.

7. The variable-composition copolymer of claim 6 wherein the (meth)acrylic acid derivatives are selected from one or more of methyl methacrylate, butyl methacrylate, isodecyl methacrylate, lauryl-myristyl methacrylate, dodecyl-pentadecyl methacrylate, cetyl-eicosyl methacrylate and cetyl-stearyl methacrylate.

8. The variable-composition copolymer of claim 5 comprising at least four different single-composition copolymers wherein no single-composition copolymer represents more than 50 weight percent of the variable-composition copolymer.

9. A concentrate for use in lubricating oils comprising a lubricating oil and from 30 to 70 percent by weight of the variable-composition copolymer of claim 7.

10. A lubricating oil composition comprising a lubricating oil and from 0.05 to 20 per cent by weight of the variable-composition copolymer of claim 7.

11. A method for maintaining low temperature fluidity of lubricating oil compositions comprising adding from 0.05 to 3 percent by weight of the variable-composition copolymer of claim 7 to a lubricating oil.

12. The continuously variable-composition copolymer of claim 5, wherein said lubricating oil is selected from the group consisting of petroleum base oil, synthetic base oils and a mixture thereof.

13. The continuously variable-composition copolymer of claim 5, wherein said copolymerizable monomers comprise $C_{7-24}$ alkyl(meth)acrylate monomers.

14. The continuously variable-composition copolymer of claim 5, wherein said copolmerizable monomers comprise $C_{7-15}$ alkyl(meth)acrylate monomers.

15. The continuously variable-composition copolymer of claim 5, wherein said copolymerizable monomers comprise $C_{16-24}$ alkyl(meth)acrylate monomers.

16. A method of inhibiting the growth of paraffin crystals in a composition comprising adding to a composition in need thereof, a continuously variable-composition copolymer prepared by:
  (a) forming a first reaction mixture comprising a monomer-containing phase in which two or more copolymerizable monomers are present in a weight percent ratio from $X_1/Y_1$ to $Y_1/X_1$;

(b) forming one or more additional reaction mixtures comprising a monomer-containing phase in which two or more copolymerizable monomers are present in a weight percent ratio from $X_n/Y_n$ to $Y_n/X_n$;

(c) initiating a free-radical addition polymerization by gradual addition of the first reaction mixture or a mixture of the first reaction mixture with the one or more additional reaction mixtures to a reactor under polymerization conditions;

(d) continuing the polymerization by gradual addition of the one or more additional reaction mixtures
   (i) to the reactor or
   (ii) to the first reaction mixture being added to the reactor at a point prior to where the first reaction mixture is added to the reactor; and (e) maintaining polymerization conditions until at least 90% of the two or more copolymerizable monomers has been converted to copolymer;

wherein $X_1$ and $Y_1$ represent weight percents of any two X and Y monomers of the two or more copolymerizable monomers in the first reaction mixture;

wherein $X_n$ and $Y_n$ represent weight percents of any two X and Y monomers of the two or more copolymerizable monomers in the one or more additional reaction mixtures;

$X_1$, $X_n$, $Y_1$ and $Y_n$ have values from zero to 100 percent;

n represents successive integers from 2 to 10 corresponding to each of the one or more additional reaction mixtures containing the analogous $X_n$ and $Y_n$ weight percents;

the maximum value of n represents the total number of reaction mixtures use in the process;

wherein the gradual addition of the one or more additional reaction mixtures in step (d) is conducted such that at least one of $[X_i-X_T]$ or $[Y_i-Y_T]$ absolute values in the reactor is at least 5 percent and $X_i$, $X_T$, $Y_i$ and $Y_T$ represent instantaneous weight percents of any two X and Y monomers added to the reactor initially ($X_i$ and $Y_i$) and at some time later in the polymerization ($X_T$ and $Y_T$)

and wherein said copolymer has a weight average molecular weight from 10,000 to 1,000,000; and said copolymer is soluble in a lubricating oil.

* * * * *